(12) United States Patent
Tam et al.

(10) Patent No.: US 9,572,065 B2
(45) Date of Patent: Feb. 14, 2017

(54) DYNAMICALLY ADJUSTING WIRELESS STATION CONNECTIONS IN A CO-LOCATED ACCESS POINT SYSTEM

(71) Applicant: Telefonaktiebolaget LM Ericsson (publ), Stockholm (SE)

(72) Inventors: Gary Tam, Hong Kong (HK); Ajay Kumar Gupta, Pune (IN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 58 days.

(21) Appl. No.: 14/489,189

(22) Filed: Sep. 17, 2014

(65) Prior Publication Data
US 2015/0092555 A1 Apr. 2, 2015

(30) Foreign Application Priority Data
Sep. 30, 2013 (IN) .......................... 1116/KOL/2013

(51) Int. Cl.
*H04W 28/02* (2009.01)
*H04W 84/12* (2009.01)
(Continued)

(52) U.S. Cl.
CPC ......... *H04W 28/0236* (2013.01); *H04W 28/08* (2013.01); *H04W 84/12* (2013.01); *H04W 88/08* (2013.01); *H04W 28/18* (2013.01)

(58) Field of Classification Search
CPC .. H04W 28/0236; H04W 84/12; H04W 28/08; H04W 88/08; H04W 28/18; H04L 47/125
(Continued)

(56) References Cited

U.S. PATENT DOCUMENTS

| 6,738,625 B1 * | 5/2004 | Oom ..................... H04W 24/02 |
|---|---|---|
| | | 455/446 |
| 2002/0191250 A1 * | 12/2002 | Graves ............... H04Q 11/0066 |
| | | 398/82 |

(Continued)

FOREIGN PATENT DOCUMENTS

| EP | 1 408 653 B1 | 1/2006 |
|---|---|---|
| EP | 2 124 495 A2 | 11/2009 |

(Continued)

OTHER PUBLICATIONS

International Search Report and Written Opinion dated Dec. 22, 2014 for International Application No. PCT/IB2014/064607, International Filing Date: Sep. 17, 2014 consisting of 10-pages.

*Primary Examiner* — Mark Rinehart
*Assistant Examiner* — Kenneth P Hunt
(74) *Attorney, Agent, or Firm* — Christopher & Weisberg, P.A.

(57) ABSTRACT

A method for equalizing an average throughput of a plurality of wireless communication network access points is provided. Each access point having a respective average throughput value and at least one control parameter, the at least one control parameter controlling wireless connectivity at the access point. An average throughput value received from each of the plurality of access points is determined. A first wireless communication network access point for configuration is determined based on the average throughput values received from each of the plurality of access points. The at least one control parameter of the determined first wireless communication network access point is set to at least one threshold value to effect equalization of the average throughput values among the wireless communication network access points.

33 Claims, 6 Drawing Sheets

(51) Int. Cl.
*H04W 88/08* (2009.01)
*H04W 28/08* (2009.01)
*H04W 28/18* (2009.01)

(58) Field of Classification Search
USPC .......................................... 370/235; 455/453
See application file for complete search history.

(56) References Cited

U.S. PATENT DOCUMENTS

| | | | | |
|---|---|---|---|---|
| 2003/0081628 | A1* | 5/2003 | Sugar | H04L 12/5695 370/461 |
| 2004/0095942 | A1* | 5/2004 | Lung | H04L 47/125 370/400 |
| 2005/0090263 | A1* | 4/2005 | Ebata | H04W 16/08 455/453 |
| 2005/0152320 | A1* | 7/2005 | Marinier | H04W 16/06 370/338 |
| 2005/0153702 | A1* | 7/2005 | Cuffaro | H04W 16/08 455/452.1 |
| 2007/0248033 | A1* | 10/2007 | Bejerano | H04W 16/08 370/318 |
| 2007/0248059 | A1* | 10/2007 | Jain | H04W 28/16 370/338 |
| 2008/0267146 | A1* | 10/2008 | Lewis | H04W 80/00 370/338 |
| 2009/0196195 | A1 | 8/2009 | Gerstenberger et al. | |
| 2009/0290489 | A1* | 11/2009 | Wang | H04W 28/06 370/230 |
| 2009/0310578 | A1* | 12/2009 | Convertino | H04W 76/043 370/338 |
| 2009/0318136 | A1* | 12/2009 | Dillinger | H04W 88/10 455/426.1 |
| 2010/0240373 | A1 | 9/2010 | Ji et al. | |
| 2011/0299422 | A1* | 12/2011 | Kim | H04W 48/16 370/253 |
| 2013/0077505 | A1* | 3/2013 | Choudhary | H04W 48/14 370/252 |
| 2013/0272285 | A1* | 10/2013 | Goldsmith | H04W 24/02 370/338 |
| 2014/0066077 | A1* | 3/2014 | Brisebois | H04W 16/08 455/445 |
| 2014/0148165 | A1* | 5/2014 | Serravalle | H04W 16/14 455/436 |
| 2014/0153434 | A1* | 6/2014 | Kokovidis | H04L 67/12 370/252 |
| 2015/0092555 | A1* | 4/2015 | Tam | H04W 28/0236 370/235 |

FOREIGN PATENT DOCUMENTS

EP   2 296 394 A1   3/2011
EP   2 373 076 A1   5/2011

* cited by examiner

DYNAMICALLY ADJUSTING WIRELESS STATION CONNECTIONS IN A CO-LOCATED ACCESS POINT SYSTEM

CROSS-REFERENCE TO RELATED APPLICATION

This application is related to and claims priority to Indian Patent Application Serial No. 1116/KOL/2013, filed Sep. 30, 2013, entitled "DYNAMICALLY ADJUSTING WIRELESS STATION CONNECTIONS IN A CO-LOCATED ACCESS POINT SYSTEM", the entirety of which is incorporated herein by reference.

TECHNICAL FIELD

The disclosure relates to wireless communication networks, and in particular, to managing Wi-Fi access point connectivity.

BACKGROUND

As the demand for Wi-Fi services increases, Wi-Fi service providers have continued to deploy new products and services to meet this demand. Some service providers often sell bandwidth service level agreements to wireless end-users in the Wi-Fi access system. In these current Wi-Fi access systems, the wireless station (STA) connects to Wi-Fi Access Points (APs) based on the Institute of Electrical and Electronic Engineers (IEEE) 802.11 MAC protocol. The wireless station often associates to a Wi-Fi AP having the strongest Receive Signal Strength (RSSI) in a co-located Wi-Fi cell coverage area. However, even though the 802.11 MAC protocol may connect wireless STAs to the AP having the strongest RSSI, the Wi-Fi Access Point may still fail to offer best average user bandwidth to the wireless station, thereby possibly failing to meet the service level agreement.

Failure to meet these SLAs is not acceptable to service providers or users. Therefore, in order to mitigate issues of capacity constraint and capacity degradation that negatively affect the ability of service providers to meet SLAs, Wi-Fi service providers commonly deploy multiple access points in a co-located fashion in a particular area with the aim of improving reliability and capacity for Wi-Fi services to a large number of wireless stations in the area, and to control capacity degradation from interference and noise.

This over-provisioning model is widely employed in an effort to help ensure bandwidth for user service level agreements. Nevertheless, this model cannot guarantee the user bandwidth, and incurs drawbacks in terms of cost, efficiency, and effective use of channel bandwidth. In particular, this and other deployments of co-located AP systems that try to provide additional capacity to their respective areas do not employ any scheme to maintain optimal performance levels at the co-located APs.

For example, some systems with co-located APs employ a general and simplified scheme of equally dividing the wireless station (STAs) among the APs in the co-located system. In other words, an incoming wireless station (STA) is assigned to the AP that has the least number of connected wireless stations in the co-located system of Access Points. However, this scheme of dividing the number of wireless stations equally among the Access Points of a co-located system disadvantageously results in non-optimum performance levels for wireless STAs connecting or that are connected to the system of co-located Access Points. For example, the scheme of dividing the number of wireless stations equally among the Access Points of a co-located system ignores various factors such as connected wireless stations activity, Wi-Fi link rates for connected wireless stations, interference levels at various Access Points, etc., thereby leading to non-optimum performance.

SUMMARY

The present arrangement advantageously provides a method and system for managing Wi-Fi access point connectivity by modifying or adjusting control parameters at the Wi-Fi access point.

According to one embodiment, a controller for equalizing an average throughput of a plurality of wireless communication network access points is provided. The plurality of wireless communication network access points are positioned with respect to each other in order to provided increased wireless capacity to a plurality of wireless stations operating in an area. Each wireless communication network access point has a respective average throughput value and at least one control parameter. The at least one control parameter controls wireless connectivity at the wireless communication network access point. The controller includes a memory and processor in communication with the memory. The processor is configured to determine an average throughput value received from each of the plurality of wireless communication network access points and to determine a first wireless communication network access point for configuration based on the average throughput values received from each of the plurality of wireless communication network access points. The processor is further configured to set the at least one control parameter of the determined first wireless communication network access point to at least one threshold value to effect equalization of the average throughput values among the plurality of wireless communication network access points. The processor is further configured to cause transmission of the set at least one control parameter to the determined first wireless communication network access point.

According to one embodiment of this aspect, the determination of the first wireless communication network access point for configuration includes determining the first wireless communication network access point has a highest average throughput value from among the received average throughput values. According to another embodiment of this aspect, the at least one control parameter of the first wireless communication network access point includes: an admit connectivity parameter configured to regulate admission of unconnected wireless stations to the first wireless communication network access point, and a discard connectivity parameter configured to regulate the number of connected wireless stations at the first wireless communication network access point. According to yet another embodiment of this aspect, the setting of the at least one control parameter of the first wireless communication network access point to at least one threshold value includes: setting the admit connectivity parameter to a minimum value, and setting the discard connectivity parameter to a value lower than the minimum value by a predefined amount.

According to yet another embodiment of this aspect, the processor is further configured to determine a second wireless communication network access point from the plurality of wireless communication network access points for configuration based on the received average throughput values. The processor is further configured to set at least one control parameter of the second wireless communication network access point to at least one threshold value based on the average throughput value of first wireless communication network access point and the average throughput value of the second wireless communication network access point to effect equalization of the average throughput values.

According to one embodiment of this aspect, the at least one control parameter of the second wireless communication network access point includes: an admit connectivity parameter configured to regulate admission of unconnected wireless stations to the second wireless communication network access point, and a discard connectivity parameter configured to regulate the number of connected wireless stations at the second wireless communication network access point. If the average throughput value of the second wireless communication network access point is not within a predefined percentage from the average throughput value of the first wireless communication network access point, the setting of the at least one control parameter of the second wireless communication network access point includes: increasing the threshold value of the admit connectivity parameter by a predefined amount, and decreasing the threshold value of the discard connectivity parameter by a predefined amount below the value of the increased admit connectivity parameter.

According to one embodiment of this aspect, the at least one control parameter of the second wireless communication network access point includes: an admit connectivity parameter configured to regulate admission of unconnected wireless stations to the second wireless communication network access point, and a discard connectivity parameter configured to regulate the number of connected wireless stations at the second wireless communication network access point. If the average throughput value of the second wireless communication network access point is within a predefined percentage from the average throughput value of the first wireless communication network access point, the setting of the at least one control parameter of the second wireless communication network access point includes: decreasing the threshold value of the admit connectivity parameter by a predefined amount, and decreasing the threshold value of the discard connectivity parameter by a predefined amount below the value of the decreased admit connectivity parameter.

According to one embodiment of this aspect, the processor is further configured to sort the received average throughput values based on value. The determined second wireless communication network access point from the plurality of wireless communication network access points is the second highest value of the received average throughput values. According to one embodiment of this aspect, the admit connectivity parameter is an Admit Received Signal Strength Indicator (RSSI) parameter. According to one embodiment of this aspect, the discard connectivity parameter includes a Discard Received Signal Strength Indicator (RSSI) parameter. According to one embodiment of this aspect, the average throughput, ATU, value received from a wireless communication network access point is based on the equation ATU=NB/(TNB*NWS), where NB is equal to the number of bytes successfully transmitted in a time interval, TNB is equal to the time taken in transmitting the successfully transmitted bytes in the time interval and NWS is equal to the number of wireless stations for which the wireless communication network access point had outstanding packets for transmission in the time interval.

According to another embodiment, a method for equalizing an average throughput of a plurality of wireless communication network access points is provided. The plurality of wireless communication network access points are positioned with respect to each other in order to provided increased wireless capacity to a plurality of wireless stations operating in an area. Each wireless communication network access point having a respective average throughput value and at least one control parameter. The at least one control parameter controls wireless connectivity at the wireless communication network access point. An average throughput value received from each of the plurality of wireless communication network access points is determined. A first wireless communication network access point for configuration based on the average throughput values received from each of the plurality of wireless communication network access points is determined. The at least one control parameter of the determined first wireless communication network access point is set to at least one threshold value to effect equalization of the average throughput values among the plurality of wireless communication network access points. The set at least one control parameter is transmitted to the determined first wireless communication network access point.

According to one embodiment of this aspect, the determining of the first wireless communication network access point for configuration includes determining the first wireless communication network access point has a highest average throughput value from among the received average throughput values. According to another embodiment of this aspect, the at least one control parameter of the first wireless communication network access point includes: an admit connectivity parameter configured to regulate admission of unconnected wireless stations to the first wireless communication network access point, and a discard connectivity parameter configured to regulate the number of connected wireless stations at the first wireless communication network access point. According to yet another embodiment of this aspect, setting the at least one control parameter of the first wireless communication network access point to at least one threshold value includes setting the admit connectivity parameter to a minimum value, and setting the discard connectivity parameter to a value lower than the minimum value by a predefined amount. According to yet another embodiment of this aspect, a second wireless communication network access point is determined from the plurality of wireless communication network access points for configuration based on the received average throughput values. At least one control parameter of the second wireless communication network access point is set to at least one threshold value based on the average throughput value of first wireless communication network access point and the average throughput value of the second wireless communication network access point to effect equalization of the average throughput values.

According to one embodiment of this aspect, the at least one control parameter of the second wireless communication network access point includes: an admit connectivity parameter configured to regulate admission of unconnected wireless stations to the second wireless communication network access point, and a discard connectivity parameter configured to regulate the number of connected wireless stations at the second wireless communication network access point. If the average throughput value of the second wireless communication network access point is not within a predefined percentage from the average throughput value of the first wireless communication network access point, the setting of the at least one control parameter of the second wireless communication network access point includes: increasing the threshold value of the admit connectivity parameter by a predefined amount, and decreasing the threshold value of the discard connectivity parameter by a predefined amount below the value of the increased admit connectivity parameter. According to one embodiment of this aspect, the at least one control parameter of the second wireless communication network access point includes: an admit connectivity parameter configured to regulate admission of unconnected wireless stations to the second wireless communication network access point, and a discard connectivity parameter configured to regulate the number of connected wireless stations at the second wireless communication network access point. If the average throughput value of the second wireless communication network access point is within a predefined percentage from the average throughput value of the first wireless communication network access point, the setting of the at least one control parameter of the second wireless communication network access point includes: decreasing the threshold value of the admit connectivity parameter by a predefined amount, and decreasing the threshold value of the discard connectivity parameter by a predefined amount below the value of the decreased admit connectivity parameter.

According to another embodiment of this aspect, the received average throughput values are sorted based on value. The determined second wireless communication network access point from the plurality of wireless communication network access points is the second highest value of the received average throughput values. According to one embodiment of this aspect, the admit connectivity parameter is an Admit Received Signal Strength Indicator (RSSI) parameter. According to one embodiment of this aspect, the discard connectivity parameter includes a Discard Received Signal Strength Indicator (RSSI) parameter. According to one embodiment of this aspect, the average throughput, ATU, value received from a wireless communication network access point is based on the equation ATU=NB/(TNB*NWS), where NB is equal to the number of bytes successfully transmitted in a time interval, TNB is equal to the time taken in transmitting the successfully transmitted bytes in the time interval and NWS is equal to the number of wireless stations for which the wireless communication network access point had outstanding packets for transmission in the time interval.

According to another embodiment, a controller for equalizing an average throughput of a plurality of wireless communication network access points is provided. The plurality of wireless communication network access points are positioned with respect to each other in order to provided increased wireless capacity to a plurality of user devices operating in an area. Each wireless communication network access point has a respective average throughput value and at least one control parameter. The at least one control parameter controls wireless connectivity at the wireless communication network access point. The controller includes a configuration module configured to: determine an average throughput value received from each of the plurality of wireless communication network access points, determine a first wireless communication network access point for configuration based on the average throughput values received from each of the plurality of wireless communication network access points, and set at least one control parameter of the determined first wireless communication network access point to at least one threshold to effect equalization of the average throughput values. The controller includes a communication module configured to transmit the set at least one control parameter to the determined first wireless communication network access point.

According to another embodiment of this aspect, the determining of the first wireless communication network access point for configuration includes determining the first wireless communication network access point has a highest average throughput value from among the received average throughput values. According to one embodiment of this aspect, the at least one control parameter of the first wireless communication network access point includes an admit connectivity parameter configured to regulate admission of unconnected wireless stations to the first wireless communication network access point, and includes a discard connectivity parameter configured to regulate the number of connected wireless stations at the first wireless communication network access point. According to one embodiment of this aspect, the setting of the at least one control parameter of the first wireless communication network access point to a corresponding threshold value includes setting the admit connectivity parameter to a minimum value, and setting the discard connectivity parameter to a value lower than the minimum value by a predefined amount.

According to one embodiment of this aspect, the configuration module is further configured to determine a second wireless communication network access point from the plurality of wireless communication network access points for configuration based on the received average throughput values. The configuration module is further configured to set at least one control parameter of the second wireless communication network access point to at least one threshold value based on the average throughput value of first wireless communication network access point and the average throughput value of the second wireless communication network access point to effect equalization of the average throughput values. According to another embodiment of this aspect, the at least one control parameter of the second wireless communication network access point includes an admit connectivity parameter configured to regulate admission of unconnected wireless stations to the second wireless communication network access point. The at least one control parameter of the second wireless communication network access point includes a discard connectivity parameter configured to regulate the number of connected wireless stations at the second wireless communication network access point. If the average throughput value of the second wireless communication network access point is not within a predefined percentage from the average throughput value of the first wireless communication network access point, the setting of the at least one control parameter of the second wireless communication network access point includes increasing the threshold value of the admit connectivity parameter by a predefined amount, and decreasing the threshold value of the discard connectivity parameter by a predefined amount below the value of the admit connectivity parameter. According to one embodiment of this aspect, the at least one control parameter of the second wireless communication network access point includes an admit connectivity parameter configured to regulate admission of unconnected wireless stations to the second wireless communication network access point, and a discard connectivity parameter configured to regulate the number of connected wireless stations at the second wireless communication network access point. If the average throughput value of the second wireless communication network access point is within a predefined percentage from the average throughput value of the first wireless communication network access point, the setting of the at least one control parameter of the second wireless communication network access point includes decreasing the threshold value of the admit connectivity parameter by a predefined amount, and decreasing the threshold value of the discard connectivity parameter by a predefined amount below the value of the admit connectivity parameter.

According to another embodiment of this aspect, the configuration module is further configured to sort the received average throughput values based on value. The determined second wireless communication network access point from the plurality of wireless communication network access points is the second highest value of the received average throughput values. According to one embodiment of this aspect, the admit connectivity parameter is an Admit Received Signal Strength Indicator (RSSI) parameter. According to one embodiment of this aspect, the discard connectivity parameter includes a Discard Received Signal Strength Indicator (RSSI) parameter. According to another embodiment of this aspect, the average throughput, ATU, value received from a wireless communication network access point is based on the equation ATU=NB/(TNB*NWS), where NB is equal to the number of bytes successfully transmitted in a time interval, TNB is equal to the time taken in transmitting the successfully transmitted bytes in the time interval and NWS is equal to the number of wireless stations for which the wireless communication network access point had outstanding packets for transmission in the time interval.

BRIEF DESCRIPTION OF THE DRAWINGS

A more complete understanding of the disclosure, and the attendant advantages and features thereof, will be more readily understood by reference to the following detailed description when considered in conjunction with the accompanying drawings wherein.

DETAILED DESCRIPTION

The system, devices and methods described herein provide for dynamically managing Wi-Fi access point connectivity by modifying or adjusting control parameters of various Access Points (APs) in a system of co-located APs in order to help optimize performance levels for wireless STAs connected and/or connecting to the system of co-located APs. The dynamically modification and/or adjustment of APs is part of a control process or loop that is continuously run in short intervals with the aim of equalizing the average throughput per wireless station at the multiple APs of the co-located AP System by adjusting the values of one or more control parameters of each co-located AP. As used herein, co-located means one or more APs positioned in such a manner so as to provide increased wireless capacity to wireless devices/stations operating at a particular location or area. The access point is equipped with a wireless radio. The control process may be implemented on a central device or apparatus such as a Wi-Fi controller that is deployed to co-ordinate and/or control the various functions of one or more sets of co-located APs. Therefore, the elements described herein dynamically regulate the wireless STAs among multiple co-located APs in order to provide additional Wi-Fi bandwidth capacity to serve a greater number of STAs at optimal performance levels.

Accordingly, the device and method components have been represented where appropriate by conventional symbols in the drawings, showing only those specific details that are pertinent to understanding the embodiments of the concepts described herein so as not to obscure the disclosure with details that will be readily apparent to those of ordinary skill in the art having the benefit of the description herein.

Before describing in detail exemplary embodiments that are in accordance with the disclosure, it is noted that the embodiments reside primarily in combinations of apparatus components and processing steps related to dynamically configuring or adjusting co-located Access Points (APs). Accordingly, components have been represented where appropriate by conventional symbols in the drawings, shown only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 1:
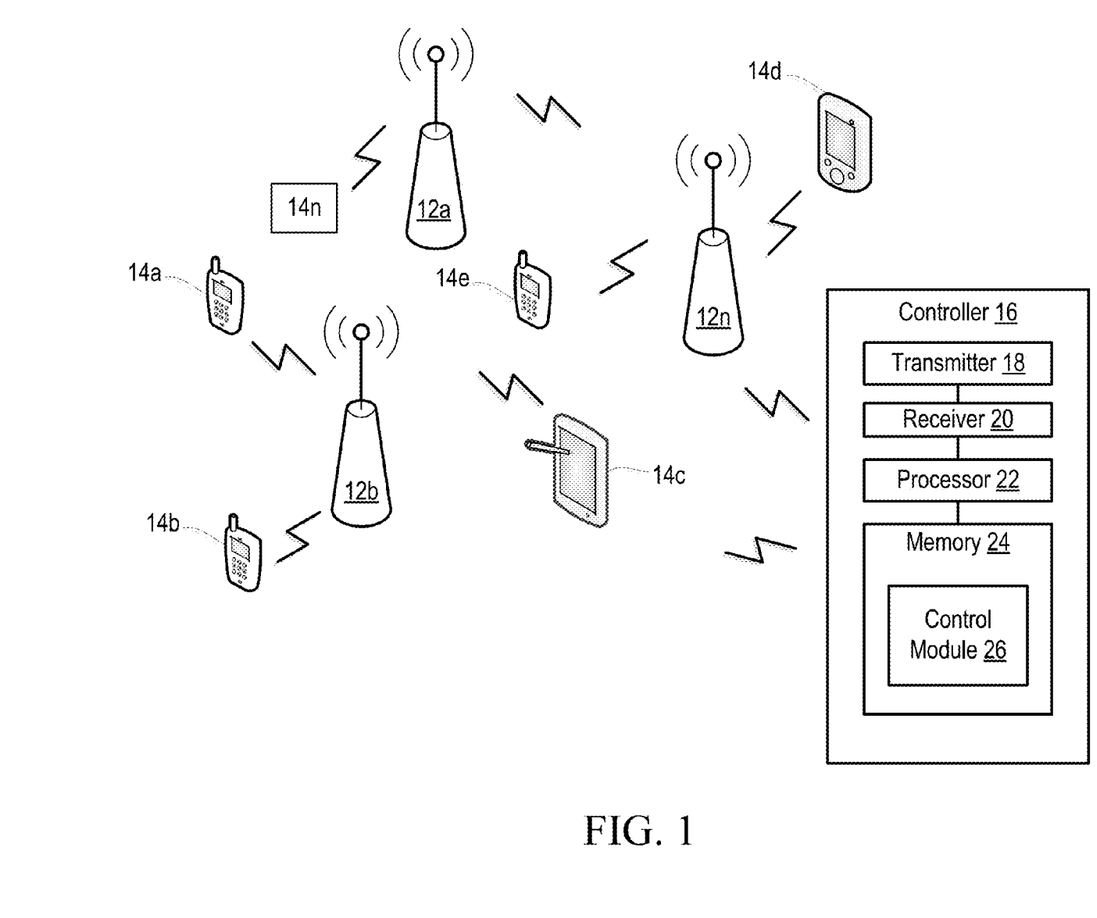
FIG. 1 a block diagram of an exemplary system that dynamically configures and adjust wireless communication network access points in accordance with the principles of the disclosure.

Referring now to drawing figures in which like reference designators refer to like elements there is shown in FIG. 1 an exemplary system for dynamically configuring or adjusting wireless APs 12 in accordance with the principles of the disclosure and designated generally as "10." System 10 includes one or more wireless communication network Access Points 12a-12n (hereinafter collectively referred to as "AP 12"), one or more wireless stations (STAs) 14a-14n (hereinafter collectively referred to as "wireless station 14" or "wireless STA 14") and one or more controllers 16 in communication with each other. In one embodiment, system 10 may be a co-located configuration of multiple Institute of Electrical and Electronic Engineers (IEEE) 802.11g based APs 12, each equipped with a radio, e.g., for the 2.4 GHz band as specified by IEEE 802.11g, such as to provide three times their individual AP bandwidth capacity in a particular area by operating three APs 12 over three non-overlapping IEEE 802.11g channels of 2.4 GHz, e.g., channels 1, 6 and 11. Other embodiments of system 10 that incorporate different frequencies and/or standards for co-located APs 12 may be used based on design need. AP 12 may be in communication with wireless station 14 using underlying 802.11 MAC protocols. While APs 12 are shown being physical separate from each other, one or more APs may be physically combined. AP 12 may include a transmitter, receiver, processor and memory substantially corresponding to similar components of controller 16, discussed below, but that provide AP 12 functions such as calculating average throughput per STA 14 and transmitting the calculated average throughput to controller 16. AP 12 may periodically calculate and transmit the average throughput values to controller 16. Wireless STA 14 may be a wireless device carried by a user to connect to a Wide Local Area Network (WLAN) employing a co-located system of APs 12. Wireless devices may include mobile wireless devices, laptops, tablets, personal digital assistants (PDAs), and the like.

Controller 16 enforces access point schemes by controlling various functions of APs 12. By dynamically controlling various functions of APs 12, controller 16 is able to regulate wireless STAs 14 connections to various APs 12 to help obtain optimum performance levels for all wireless STAs 14 seeking access or continuing connectivity to a co-located AP 12 system. Controller 16 may be positioned physically separate from one or more APs 12, or may be part of one of more APs 12. Controller 16 includes one or more transmitters 18 and one or more receivers 20 for communicating with APs 12, wireless STAs 14 and other network devices via one or more communication networks and/or channels. In one embodiment, one or more transmitters 18 and one or more receivers 20 may be replaced by one or more transceivers, or one or more communication interfaces such as wired and/or wireless communication interfaces. Controller 16 may include one or more processors 22 in communication with transmitter 18 and receiver 20. Processor 22 includes one or more central processing units (CPUs) for performing controller functions described herein.

Controller 16 includes memory 24 in communication with processor 22. Memory 24 may include non-volatile and volatile memory. For example, non-volatile memory may include a hard drive, flash memory, memory stick and the like. Also, volatile memory may include random access memory and others known in the art. Memory 24 may store program instructions such as those for control module 26 that provide dynamic configuration or adjustment of APs 12. For example, control module 26 includes instructions, which when executed by processor 22, causes processor 22 to perform the control process, discussed in detail with reference to FIGS. 2 and 3. Memory 24 may store other modules and/or data such values and thresholds. While module 26 is described as being software stored in memory 24, control module 26 may be hardware based or software-hardware based. Further separate programs can be implemented as a single program.

An exemplary process for controller 16 to select and configure a first AP 12 is described with reference to FIG. 2. The first AP 12 is an access point that will be used to determine how to configure the remaining co-located APs 12, i.e., whether the remaining APs 12 have ATU values within a predetermined amount from the ATU value of first AP 12 will determine the configuration of the remaining APs 12, as discussed below with respect to FIG. 3. The control process or loop at controller 16 may be chosen to run at periodic intervals to dynamically regulate wireless STAs 14 connections to the co-located system of APs 12. In one embodiment, controller 16 performs the control process of FIGS. 2 and 3 every minute. Processor 22 determines average throughput values received from multiple co-located APs 12 (Block S100). For example, process 22 determines receiver 20 received average throughput per wireless station (ATU) values for n APs 12 that form part of a co-located system, i.e., receive $ATU_{1t}$, $ATU_{2t}$ . . . $ATU_{nt}$ values. The ATU value may be received at a particular time interval t. Each co-located AP 12 may calculated ATU at time t as:

$$ATU_t = NB_{\Delta t}/(TNB_{\Delta t} * NWS_{\Delta t})$$

where $NB_{\Delta t}$ is the number of bytes successfully transmitted in time interval $\Delta t$, $TNB_{\Delta t}$ is the time taken in transmitting the successfully transmitted bytes in time interval $\Delta t$, and $NWS_{\Delta t}$ is the number of wireless stations for which AP 12 had outstanding packets for transmission in time interval $\Delta t$. Short periodic time intervals ($\Delta t$) may be chosen based on design need. In one example, the period time interval ($\Delta t$) is one second such that the ATU value is computed every second by respective APs 12. In one embodiment, the ATU values over several intervals can be averaged on a moving basis, i.e., a moving window, to remove transients from the calculation to arrive at a stable value at the time when the ATU values are transmitted to controller 16. In one embodiment, processor 22 sorts the received ATU values. For example, the ATU values received from APs 12 may be sorted in decreasing order such that the AP with the highest ATU value is at the top of the sorted list of ATU values.

Processor 22 of controller 16 selects first AP 12 for configuration based on the received ATU value (Block S102). In one embodiment, processor 22 selects AP 12 with the highest ATU value. For example, processor 22 selects AP 12 on top of the sorted list in which the selected AP 12 is the access point 12 that will be used as a basis for configuring the remaining co-located APs 12 in the sorted list. Processor 22 sets at least one control parameter of first AP 12 to at least one threshold (Block S104). The at least one control parameter may include an admit connectivity parameter that regulates admission of unconnected wireless STAs 14 to the wireless communication network access point, i.e., AP 12. In one embodiment, the admit connectivity parameter may be an Admit RSSI threshold in which the Admit Received Signal Strength Indication (RSSI) threshold for selected AP 12 is set to a minimum value to ensure Wi-Fi coverage in the area of co-located system of APs 12. The Admit RSSI threshold is an RSSI threshold below which a wireless STA 14 seeking connection with AP 12 would be denied, i.e., corresponds to a minimum RSSI value for likely connectivity. Adjusting the value of Admit RSSI threshold helps regulate the admission of new wireless STAs 14 seeking connections to Wi-Fi AP 12. Further, the Admit RSSI threshold allows for discarding wireless STAs 14 with weak RSSIs from connecting to Wi-Fi AP 12. The Admit RSSI threshold value may be specified in dbm.

The at least one control parameter may include a discard connectivity parameter that regulates the number of connected wireless STAs 14 at the wireless communication network access point. In one embodiment, the discard connectivity parameter may be a Discard RSSI threshold in which the Discard RSSI threshold for the selected AP 12 is set to a predetermined value lower than the admit connectivity parameter. The Discard RSSI threshold is a value below which a wireless STA already connected with AP 12 is disconnected. For example, the Discard RSSI threshold value of selected AP 12 may be set 6 dbm lower than the Admit RSSI threshold value. Adjusting the value of Discard RSSI Threshold helps regulate the number of connected wireless STAs 14 to Wi-Fi AP 12. Further, the Discard RSSI threshold value allows for disconnecting the connected wireless STA 14 with a weak RSSI to Wi-Fi AP 12. The Discard RSSI threshold value may be specified in dbm. In one embodiment, processor 22 sets both an admit connectivity parameter of selected AP 12 to a minimum value and sets a discard connectivity parameter of selected AP 12 to a predetermined value lower than the new admit connectivity parameter value in which the adjusted Admit and Discard RSSI values will encourage or discourage wireless STA 14 connectivity to AP 12 based on whether AP 12 is overloaded, i.e., has a low ATU value, or is not overloaded, i.e., has a high ATU value. An overloaded AP 12 may correspond to AP 12 that has many wireless STA 14 connections and/or may correspond to AP 12 that has few wireless STA 14 connections but one or more of the wireless STAs 14 is consuming most of the wireless resources of AP 12, thereby reducing the overall ATU for AP 12.

Processor 22 causes transmitter 18 to transmit the set at least one control parameter to selected AP 12 for implementation (Block S106). For example, selected AP 12 will configure itself to operate using the received at least one control parameter. In one embodiment, processor 22 causes transmitter 18 to transmit the set control parameters to respective co-located APs 12 including first AP 12 after all co-located APs 12 have been selected and respective control parameters.

An exemplary control process for controller 16 to select and configure APs 12 is described with reference to FIG. 3. Processor 22 selects AP 12, i.e., first AP 12, based on the received ATU value and sets at least one control parameter of selected AP 12 to at least one threshold, as described above with respect to FIG. 2 (Block S108). Processor 22 determines whether there is another co-located AP 12 to configure or adjust, i.e., if there is another AP 12 in the sorted list that has not been addressed (Block S110). If processor 22 determines there is another co-located AP 12 to configure, processor 22 selects the other AP 12 (Block S112). For example, processor 22 may determine whether there are other co-located APs 12 to configure based on the sorted list in which processor 22 selects APs 12 by moving up or down the list. In one embodiment, processor 22 moves down the sorted list such that APs 12 with higher ATU values are considered before APs 12 with lower ATU values, i.e., AP 12 with the next highest value is considered and so forth.

Processor 22 determines whether the throughput value, i.e., ATU value, of selected AP 12 is within a predefined range of throughput value of first AP 12 having highest ATU value, i.e., of first AP 12 from Block S104 (Block S114). In one embodiment, the predefined range may be twenty percent of the highest ATU value in sorted list. Other predefined ranges may be used based on design need. If processor 22 determines that the throughput value of selected AP 12 is not within a predefined range of the throughput value of first AP 12, processor 22 sets at least one control parameter to at least one discouragement threshold for selected AP 12 (Block S116). For example, processor 22 sets the admit connectivity parameter to a higher value than the current value and sets the discard connectivity parameter based on the new admit connectivity parameter value. In one embodiment, the Admit RSSI threshold for selected AP 12 is increased by a predetermined amount, e.g., 2 dbm, from its current value, and the Discard RSSI threshold value is set to a predetermined amount, e.g., 6 dbm, less than the updated/new Admit RSSI threshold value. The at least one discourage threshold value, i.e., higher Admit RSSI threshold value and updated Discard RSSI value, will reduce wireless STAs 12 connections to selected AP 12 such as to off-load connectivity from an overloaded AP 12.

Processor 22 causes transmitter 18 to transmit the at least one control parameter, i.e., setting (Block S118). For example, processor 22 causes transmitter 18 to transmit the set at least one control parameter to selected AP 12. Alternatively, controller 16 transmits the set at least one control parameters to respective co-located APs 12 after all co-located APs 12 have been selected and respective control parameters set (Block S120).

Referring back to S114, if processor 22 determines the throughput value of AP 12 selected in Block S110 is within a predefined range of the throughput value of first AP 12, processor 22 sets at least one control parameter of selected AP 12 to at least one encouragement threshold (Block S122). At least one encouragement threshold is one or more threshold values that increase wireless STA 14 connectivity to AP 12 implementing these one or more thresholds values. For example, the at least one encouragement threshold corresponds to setting the admit connectivity parameter to a lower value than the current value by a predetermined amount and setting the discard connectivity parameter based on the new admit connectivity parameter. In one embodiment, the Admit RSSI threshold value for selected AP 12 is lowered by a predetermined amount, e.g., 2 dbm, from its current value, and the Discard RSSI threshold value is set to a predetermined amount, e.g., 6 dbm, less than the new Admit RSSI threshold value. The at least one encouragement threshold value, i.e., lower Admit RSSI threshold value and updated Discard RSSI value, is designed to encourage wireless STAs 12 connections to selected AP 12, thereby reducing the net ATU value of AP 12, i.e., equalize ATU values of APs 12, in part, by increasing connectivity of APs 12 with higher ATU values such as to lower the ATU values of these APs 12. As discussed above, transmitter 18 may transmit the set control parameters after setting each AP 12 or may transmit the set control parameters after the settings for each co-located AP 12 has been set.

In one embodiment, AP 12 may have a predefined minimum and/or maximum threshold value(s) for the admit connectivity parameter such that the new or adjusted admit connectivity parameter cannot be set to a value lower than the predefined minimum threshold value or to a value higher than the predefined maximum threshold value. As such, in one embodiment, the Admit RSSI threshold value for selected AP 12 is lowered by less than the predetermined amount to the predefined minimum threshold value. Similar to the Admit RSSI threshold value, AP 12 may have predefined minimum and/or maximum threshold value(s) for the discard connectivity parameter.

Figure 3:
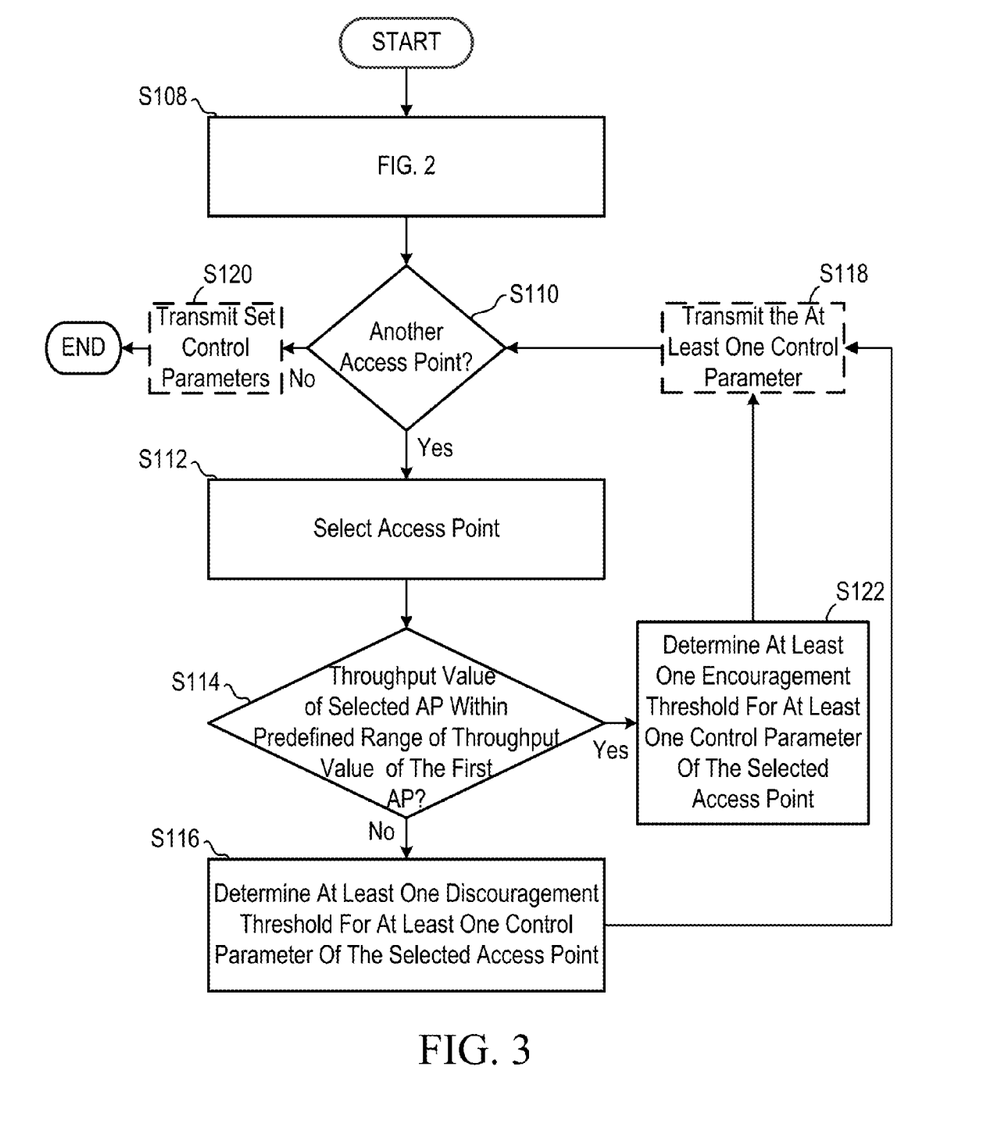
FIG. 3 is a signaling flow diagram of a control process of control module 26 in accordance with the principles of the disclosure.

The control process of FIG. 3 works to equalize the ATU values across Wi-Fi APs 12 of the co-located AP system by encouraging wireless STAs 14 to connect to certain APs 12, i.e., APs 12 with higher ATU values, and discouraging wireless STAs 14 from connecting to other APs 12, i.e., APs with lower ATU values, thereby helping equalize the ATU values across APs 12. For example, $ATU_{1t}, ATU_{2t} \ldots ATU_{nt}$ represent the value of Average throughput per wireless station measured a n Wi-Fi APs 12 forming part of a co-located system at time interval t. The goal or objective of the control process being executed by controller 16 managing the n APs can be expressed as:

$$Objective_t = ATU_{1t} = ATU_{2t} = \ldots = ATU_{nt}$$

Figure 2:
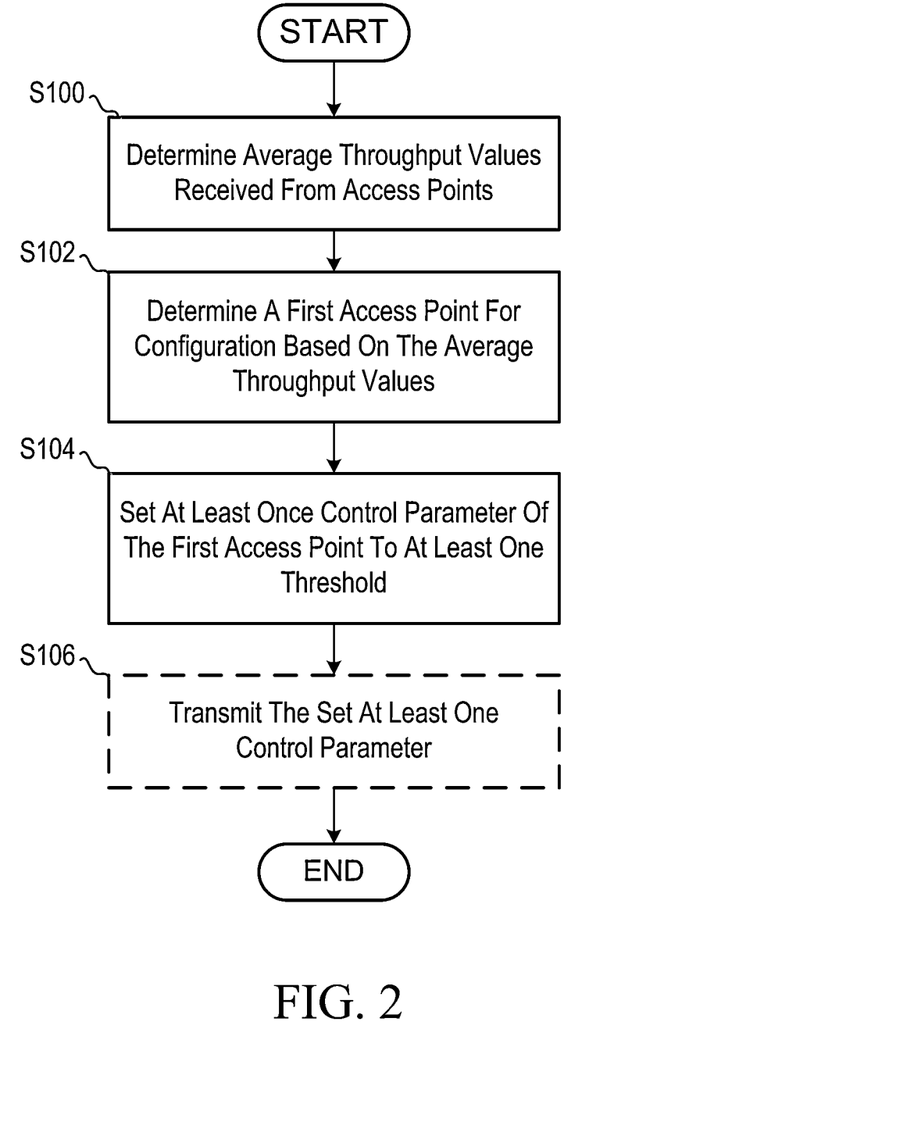
FIG. 2 is a signaling flow diagram for adjusting and setting a first wireless communication network access point during the control process of control module 26 in accordance with the principles of the disclosure.

Therefore, the control process of FIGS. 2-3 will attempt to achieve the above objective every loop by encouraging wireless STAs 14 to connect to certain APs 12, i.e., APs 12 with higher ATU values, and discouraging wireless STAs 14 from connecting to other APs 12, i.e., APs with lower ATU values such that system 10 equalize throughput performance for APs 12.

In one example, wireless STAs 14 with the weakest connections, i.e., signals, to a strained AP 12, e.g., AP 12 with ATU value not within the predefined range, in the co-located system of APs would be discarded due to the increased Admit and Discard RSSI levels of the discouragement thresholds, thereby relieving AP 12's bandwidth load. Further, the control process provides the opportunity for the discarded wireless STA 14 to join a relatively lightly loaded AP 12 that have been configured or adjusted to implement at least one encouragement threshold. This allows the co-located AP system to fulfill greater Wi-Fi capacity demands. One or more APs 12 may have varying client/wireless STA 14 admit threshold values depending on respective values for average throughput for wireless STA 14. Initially when APs 12 in a co-located system connect to controller 16 and start Wi-Fi services, the Admit RSSI threshold may be kept at its minimum value, and the Discard RSSI threshold value is set to a predetermined value below the Admit RSSI threshold. The control process of FIG. 3 may run continuously at short intervals such as to help equalize the average throughput per wireless station at all APs 12 of a co-located AP system by adjusting the values of at least two control parameters. One or more APs 12 may have varying client/ wireless STA 14 admit threshold values depending on respective values for average throughput for wireless STA 14. Initially when APs 12 in a co-located system connect to controller 16 and start Wi-Fi services, the Admit RSSI threshold may be kept at its minimum value, and the Discard RSSI threshold value is set to a predetermined value below the Admit RSSI threshold.

Figure 4:
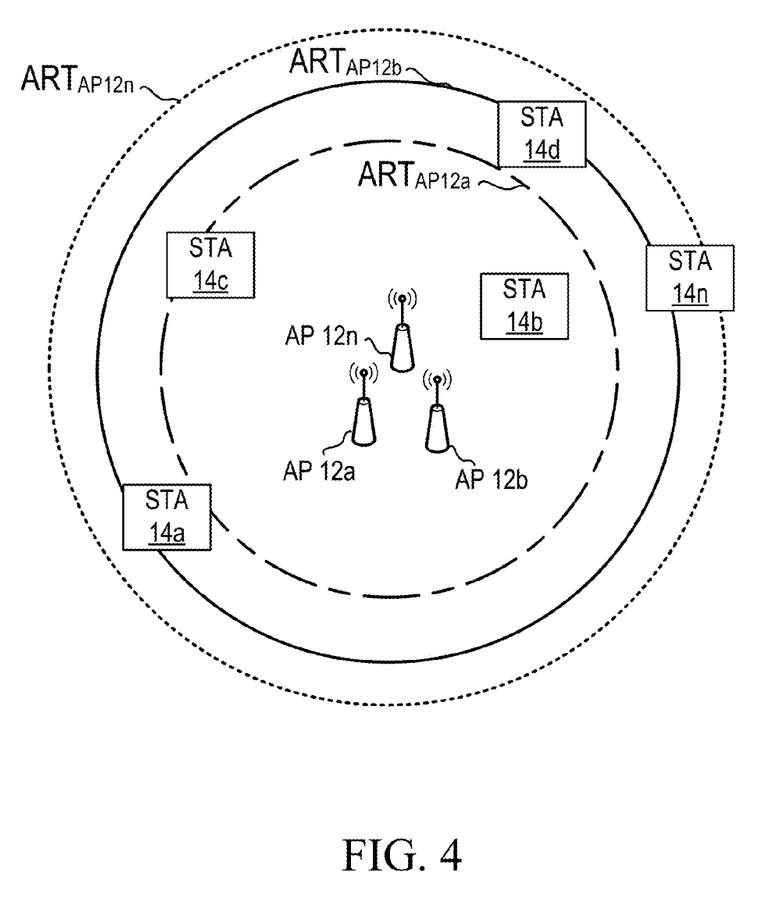
FIGS. 4 and 5 are a block diagrams of an example system of co-located wireless communication network access points in accordance with the principles of the disclosure.
Figure 5:
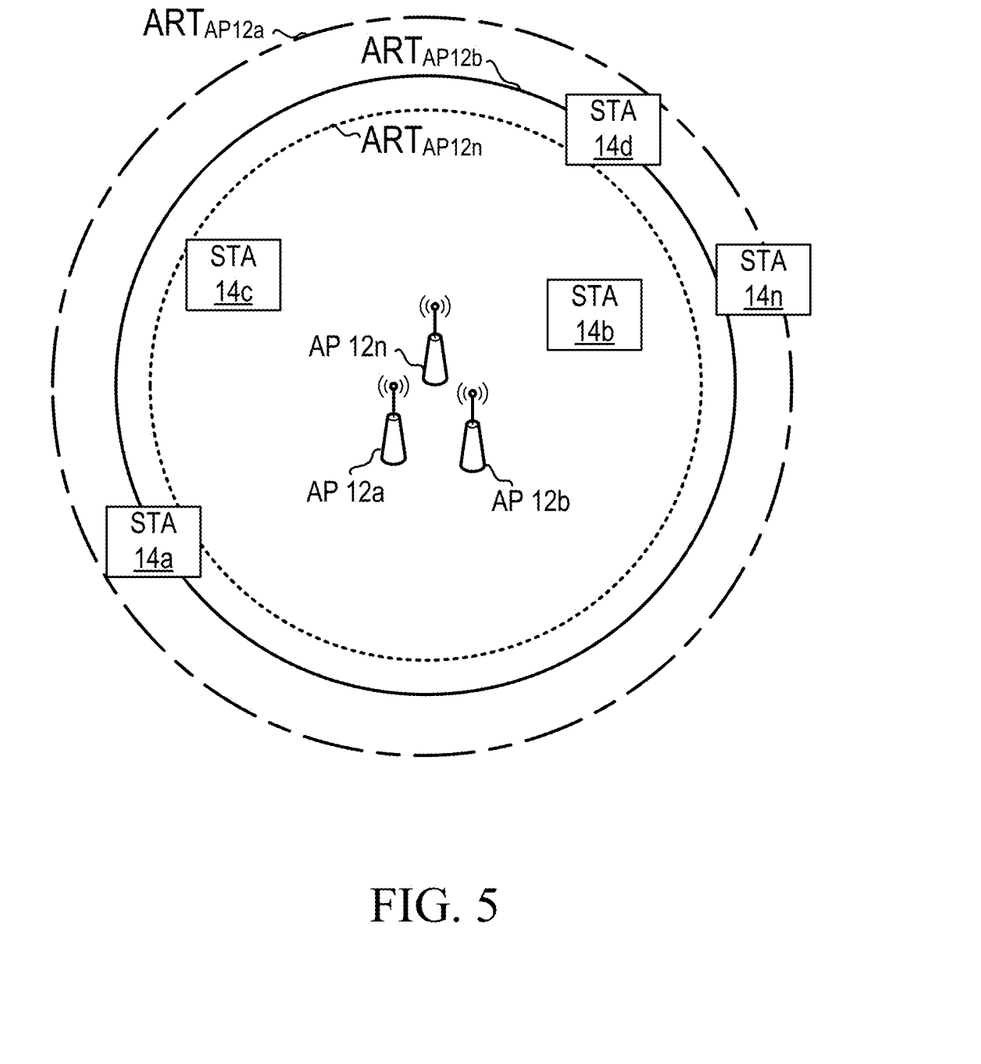

An example system 10 of co-located APs 12 is described with reference to FIGS. 4 and 5. In this example, APs 12a, 12b and 12n are co-located in which each AP 12 has varying client Admit RSSI threshold (ART) values of $ART_{AP12a}$, $ART_{AP12b}$ and $ART_{AP12n}$, respectively. For example, with respect to FIG. 4, $ART_{AP12n}$ is set to a low Admit RSSI threshold value such as to encourage wireless STA 14 connectivity to AP 12n. However, $ART_{AP12a}$ is set to a high Admit RSSI threshold value such as to discourage wireless STA 14 connectivity. As illustrated in FIG. 4, AP 12a may admit, at most, STAs 14b and 14c, while AP 12n may admit STAs 14a, 14b, 14c, 14d and 14n. In one embodiment, AP 12n may be servicing the most STAs 14 in which STA 14c is consuming more AP 12n resources per an SLA than other respective STAs 14.

Continuing the example, after one or more iteration of the control process of FIG. 3, the ATU value of AP 12a is determined to be the highest of APs 12, while the ATU value of 12n is determined to be the lowest of APs 12. In other words, AP 12n is determined to be more overloaded than AP 12a. The ART values for APs 12 are modified via one or more iterations of the control process, resulting in the ART values illustrated in FIG. 5. For example, $ART_{AP12n}$ has been reduced in order to discourage wireless STA 14 connectivity in order to help increase the ATU value of AP 12n. Also, $ART_{AP12a}$ has been increased to encourage wireless STA 14 connectivity, thereby reducing the ATU value of 12a by off-load wireless STAs 14 to AP 12a. In one example, AP 12n may still be servicing STA 14c that consumes more AP 12 resources than other STAs 14 but may have off-loaded STAs 14a, 14d and/or 14n to other APs 12 such as AP 12a and AP 12b, thereby increasing ATU value of AP 12n. Therefore, the ART values for each AP 12 are updated or adjusted by control process discussed in FIG. 3 to try to achieve equalization of respective ATU values, i.e., $Objective_s = ATU_{1t} = ATU_{2t} = \ldots = ATU_{nt}$. The difference in ART values shown in FIG. 5 from those shown in FIG. 4 may be a result of one or more iterations of the control process. While only the Admit RSSI threshold values are shown in FIGS. 4 and 5, the Discard RSSI threshold values may also be modified in accordance with control process described in FIG. 3.

Figure 6:
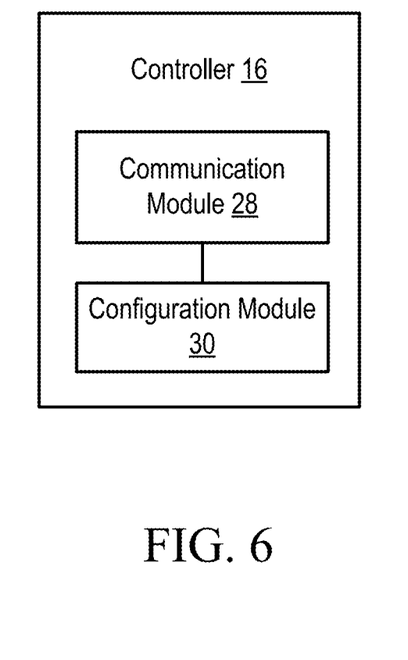
FIG. 6 is a block diagram of an alternative embodiment of the controller in accordance with the principles of the disclosure.

An alternative embodiment of controller 16 is described with reference to FIG. 6. Controller 16 includes communication module 28 that is configured to receive ATU values from co-located APs 12 and transmit set at least one control parameter to the determined first wireless communication network AP 12. Control module 30 is configured to perform the process of selecting APs for adjustment or configuration and setting control parameters as described above with respect to FIGS. 2-3. For example, in one embodiment, control module 30 is configured to determine an average throughput value received from each of the plurality of wireless communication network access points, determine a first wireless communication network access point for configuration based on the average throughput values received from each of the plurality of wireless communication network access points, and set at least one control parameter of the determined first wireless communication network access point to at least one threshold to effect equalization of the average throughput values. Control module 30 is further configured to perform of Blocks S108-S116 and S120. Communication module 28 may be further configured to perform the transmission of set control parameters, e.g., of Block S118 and/or S122.

Therefore, the concepts described herein advantageously dynamically regulates the wireless STAs 12 among a plurality of co-located APs 12 in order to provide Wi-Fi bandwidth capacity to serve a greater number of wireless STAs 12 with optimal performance levels. In particular, a centralized control process or loop is run at controller 16, e.g., WLAN controller controlling functioning of the plurality of APs 12. Controller 16 may be deployed on-site of the co-located APs 12 or remotely. The control process may run continuously on controller 16 in order to equalize the Average throughput per wireless station measured at short intervals for all APs 12 forming the part of the co-located system of APs 12. The control process compares loading factors, e.g., ATU values, for APs 12 to coordinate the decision of adjusting wireless STAs 12 connections in a WLAN by adjusting AP 12 control parameters.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the disclosure is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A controller for equalizing an average throughput of a plurality of wireless communication network access points, the plurality of wireless communication network access points being positioned with respect to each other in order to provided increased wireless capacity to a plurality of wireless communication stations operating in an area, each wireless communication network access point having a respective average throughput value and at least one control parameter, the at least one control parameter controlling wireless connectivity at the wireless communication network access point, the controller including a memory and processor in communication with the memory, the processor configured to:
   determine an average throughput value received from each of the plurality of wireless communication network access points;
   determine a first wireless communication network access point for configuration based on the average throughput values received from each of the plurality of wireless communication network access points;
   set the at least one control parameter of the determined first wireless communication network access point to at least one threshold value to effect equalization of the average throughput values among the plurality of wireless communication network access points; and
   cause transmission of the set at least one control parameter to the determined first wireless communication network access point.

2. The controller of claim 1, wherein determining the first wireless communication network access point for configuration includes determining the first wireless communication network access point has a highest average throughput value from among the received average throughput values.

3. The controller of claim 1, wherein the at least one control parameter of the first wireless communication network access point includes:
   an admit connectivity parameter configured to regulate admission of unconnected wireless stations to the first wireless communication network access point; and a discard connectivity parameter configured to regulate the number of connected wireless stations at the first wireless communication network access point.

4. The controller of claim 3, wherein the setting of the at least one control parameter of the first wireless communication network access point to at least one threshold value includes:
setting the admit connectivity parameter to a minimum value; and
setting the discard connectivity parameter to a value lower than the minimum value by a predefined amount.

5. The controller of claim 1, wherein the processor is further configured to:
determine a second wireless communication network access point from the plurality of wireless communication network access points for configuration based on the received average throughput values; and
set at least one control parameter of the second wireless communication network access point to at least one threshold value based on the average throughput value of first wireless communication network access point and the average throughput value of the second wireless communication network access point to effect equalization of the average throughput values.

6. The controller of claim 5, wherein:
the at least one control parameter of the second wireless communication network access point includes:
an admit connectivity parameter configured to regulate admission of unconnected wireless stations to the second wireless communication network access point;
a discard connectivity parameter configured to regulate the number of connected wireless stations at the second wireless communication network access point; and
if the average throughput value of the second wireless communication network access point is not within a predefined percentage from the average throughput value of the first wireless communication network access point, the setting of the at least one control parameter of the second wireless communication network access point includes:
increasing the threshold value of the admit connectivity parameter by a predefined amount; and
setting the threshold value of the discard connectivity parameter by to a predefined amount below the value of the increased admit connectivity parameter.

7. The controller of claim 5, wherein:
the at least one control parameter of the second wireless communication network access point includes:
an admit connectivity parameter configured to regulate admission of unconnected wireless stations to the second wireless communication network access point;
a discard connectivity parameter configured to regulate the number of connected wireless stations at the second wireless communication network access point; and
if the average throughput value of the second wireless communication network access point is within a predefined percentage from the average throughput value of the first wireless communication network access point, the setting of the at least one control parameter of the second wireless communication network access point includes:
decreasing the threshold value of the admit connectivity parameter by a predefined amount; and
decreasing the threshold value of the discard connectivity parameter by a predefined amount below the value of the decreased admit connectivity parameter.

8. The controller of claim 5, wherein the processor is further configured to sort the received average throughput values based on value; and
the determined second wireless communication network access point from the plurality of wireless communication network access points being the second highest value of the received average throughput values.

9. The controller of claim 1, wherein the admit connectivity parameter is an Admit Received Signal Strength Indicator (RSSI) parameter.

10. The controller of claim 1, wherein the discard connectivity parameter includes a Discard Received Signal Strength Indicator (RSSI) parameter.

11. The controller of claim 1, wherein the average throughput, ATU, value received from a wireless communication network access point is based on the equation ATU=NB/(TNB*NWS), where NB is equal to the number of bytes successfully transmitted in a time interval, TNB is equal to the time taken in transmitting the successfully transmitted bytes in the time interval and NWS is equal to the number of wireless stations for which the wireless communication network access point had outstanding packets for transmission in the time interval.

12. A method for equalizing an average throughput of a plurality of wireless communication network access points, the plurality of wireless communication network access points being positioned with respect to each other in order to provided increased wireless capacity to a plurality of wireless stations operating in an area, each wireless communication network access point having a respective average throughput value and at least one control parameter, the at least one control parameter controlling wireless connectivity at the wireless communication network access point, the method comprising:
determining an average throughput value received from each of the plurality of wireless communication network access points;
determining a first wireless communication network access point for configuration based on the average throughput values received from each of the plurality of wireless communication network access points;
setting the at least one control parameter of the determined first wireless communication network access point to at least one threshold value to effect equalization of the average throughput values among the plurality of wireless communication network access points; and
causing transmission of the set at least one control parameter to the determined first wireless communication network access point.

13. The method of claim 12, wherein determining the first wireless communication network access point for configuration includes determining the first wireless communication network access point has a highest average throughput value from among the received average throughput values.

14. The method of claim 12, wherein the at least one control parameter of the first wireless communication network access point includes:
an admit connectivity parameter configured to regulate admission of unconnected wireless stations to the first wireless communication network access point; and
a discard connectivity parameter configured to regulate the number of connected wireless stations at the first wireless communication network access point.

15. The method of claim 14, wherein setting the at least one control parameter of the first wireless communication network access point to at least one threshold value includes:
   setting the admit connectivity parameter to a minimum value; and
   setting the discard connectivity parameter to a value lower than the minimum value by a predefined amount.

16. The method of claim 12, further comprising:
   determining a second wireless communication network access point from the plurality of wireless communication network access points for configuration based on the received average throughput values; and
   setting at least one control parameter of the second wireless communication network access point to at least one threshold value based on the average throughput value of first wireless communication network access point and the average throughput value of the second wireless communication network access point to effect equalization of the average throughput values.

17. The method of claim 16, wherein:
   the at least one control parameter of the second wireless communication network access point includes:
      an admit connectivity parameter configured to regulate admission of unconnected wireless stations to the second wireless communication network access point;
      a discard connectivity parameter configured to regulate the number of connected wireless stations at the second wireless communication network access point; and
   if the average throughput value of the second wireless communication network access point is not within a predefined percentage from the average throughput value of the first wireless communication network access point, the setting of the at least one control parameter of the second wireless communication network access point includes:
      increasing the threshold value of the admit connectivity parameter by a predefined amount; and
      setting the threshold value of the discard connectivity parameter to a predefined amount below the value of the increased admit connectivity parameter.

18. The method of claim 16, wherein:
   the at least one control parameter of the second wireless communication network access point includes:
      an admit connectivity parameter configured to regulate admission of unconnected wireless stations to the second wireless communication network access point;
      a discard connectivity parameter configured to regulate the number of connected wireless stations at the second wireless communication network access point; and
   if the average throughput value of the second wireless communication network access point is within a predefined percentage from the average throughput value of the first wireless communication network access point, the setting of the at least one control parameter of the second wireless communication network access point includes:
      decreasing the threshold value of the admit connectivity parameter by a predefined amount; and
      decreasing the threshold value of the discard connectivity parameter by a predefined amount below the value of the decreased admit connectivity parameter.

19. The method of claim 16, further comprising sorting the received average throughput values based on value; and the determined second wireless communication network access point from the plurality of wireless communication network access points being the second highest value of the received average throughput values.

20. The method of claim 12, wherein the admit connectivity parameter is an Admit Received Signal Strength Indicator (RSSI) parameter.

21. The method of claim 12, wherein the discard connectivity parameter includes a Discard Received Signal Strength Indicator (RSSI) parameter.

22. The method of claim 12, wherein the average throughput, ATU, value received from a wireless communication network access point is based on the equation ATU=NB/(TNB*NWS), where NB is equal to the number of bytes successfully transmitted in a time interval, TNB is equal to the time taken in transmitting the successfully transmitted bytes in the time interval and NWS is equal to the number of wireless stations for which the wireless communication network access point had outstanding packets for transmission in the time interval.

23. A controller for equalizing an average throughput of a plurality of wireless communication network access points, the plurality of wireless communication network access points being positioned with respect to each other in order to provided increased wireless capacity to a plurality of wireless stations operating in an area, each wireless communication network access point having a respective average throughput value and at least one control parameter, the at least one control parameter controlling wireless connectivity at the wireless communication network access point, the controller comprising:
   a configuration module, the configuration module configured to:
      determine an average throughput value received from each of the plurality of wireless communication network access points;
      determine a first wireless communication network access point for configuration based on the average throughput values received from each of the plurality of wireless communication network access points;
      set at least one control parameter of the determined first wireless communication network access point to at least one threshold to effect equalization of the average throughput values; and
   a communication module, the communication module configured to transmit the set at least one control parameter to the determined first wireless communication network access point.

24. The controller of claim 23, wherein determining the first wireless communication network access point for configuration includes determining the first wireless communication network access point has a highest average throughput value from among the received average throughput values.

25. The controller of claim 23, wherein the at least one control parameter of the first wireless communication network access point includes:
   an admit connectivity parameter configured to regulate admission of unconnected wireless stations to the first wireless communication network access point; and
   a discard connectivity parameter configured to regulate the number of connected wireless stations at the first wireless communication network access point.

26. The controller of claim 25, wherein setting the at least one control parameter of the first wireless communication network access point to a corresponding threshold value includes:

setting the admit connectivity parameter to a minimum value; and
setting the discard connectivity parameter to a value lower than the minimum value by a predefined amount.

27. The controller of claim 23, wherein the configuration module is further configured to:
determine a second wireless communication network access point from the plurality of wireless communication network access points for configuration based on the received average throughput values; and
set at least one control parameter of the second wireless communication network access point to at least one threshold value based on the average throughput value of first wireless communication network access point and the average throughput value of the second wireless communication network access point to effect equalization of the average throughput values.

28. The controller of claim 27, wherein:
the at least one control parameter of the second wireless communication network access point includes:
an admit connectivity parameter configured to regulate admission of unconnected wireless stations to the second wireless communication network access point;
a discard connectivity parameter configured to regulate the number of connected wireless stations at the second wireless communication network access point; and
if the average throughput value of the second wireless communication network access point is not within a predefined percentage from the average throughput value of the first wireless communication network access point, the setting of the at least one control parameter of the second wireless communication network access point includes:
increasing the threshold value of the admit connectivity parameter by a predefined amount; and
setting the threshold value of the discard connectivity parameter to a predefined amount below the value of the admit connectivity parameter.

29. The controller of claim 27, wherein:
the at least one control parameter of the second wireless communication network access point includes:
an admit connectivity parameter configured to regulate admission of unconnected wireless stations to the second wireless communication network access point;
a discard connectivity parameter configured to regulate the number of connected wireless stations at the second wireless communication network access point; and
if the average throughput value of the second wireless communication network access point is not within a predefined percentage from the average throughput value of the first wireless communication network access point, the setting of the at least one control parameter of the second wireless communication network access point includes:
decreasing the threshold value of the admit connectivity parameter by a predefined amount; and
decreasing the threshold value of the discard connectivity parameter by a predefined amount below the value of the admit connectivity parameter.

30. The controller of claim 27, wherein the configuration module is further configured to sort the received average throughput values based on value; and
the determined second wireless communication network access point from the plurality of wireless communication network access points being the second highest value of the received average throughput values.

31. The controller of claim 23, wherein the admit connectivity parameter is an Admit Received Signal Strength Indicator (RSSI) parameter.

32. The controller of claim 23, wherein the discard connectivity parameter includes a Discard Received Signal Strength Indicator (RSSI) parameter.

33. The controller of claim 23, wherein the average throughput, ATU, value received from a wireless communication network access point is based on the equation $ATU=NB/(TNB*NWS)$, where NB is equal to the number of bytes successfully transmitted in a time interval, TNB is equal to the time taken in transmitting the successfully transmitted bytes in the time interval and NWS is equal to the number of wireless stations for which the wireless communication network access point had outstanding packets for transmission in the time interval.

* * * * *